United States Patent
Edic et al.

(10) Patent No.: US 7,054,475 B2
(45) Date of Patent: May 30, 2006

(54) APPARATUS AND METHOD FOR VOLUMETRIC RECONSTRUCTION OF A CYCLICALLY MOVING OBJECT

(75) Inventors: Peter Michael Edic, Albany, NY (US); Maria Iatrou, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 751 days.

(21) Appl. No.: 10/033,952

(22) Filed: Dec. 28, 2001

(65) Prior Publication Data

US 2003/0123718 A1 Jul. 3, 2003

(51) Int. Cl.
*G06K 9/00* (2006.01)

(52) U.S. Cl. ...................................... 382/131
(58) Field of Classification Search ............... 382/131; 600/425; 378/5, 9
See application file for complete search history.

(56) References Cited

U.S. PATENT DOCUMENTS

| 3,871,360 | A | | 3/1975 | Van Horn et al. |
| 3,954,098 | A | | 5/1976 | Dick et al. |
| 4,182,311 | A | | 1/1980 | Seppi et al. |
| 5,243,664 | A | * | 9/1993 | Tuy ........................... 382/130 |
| 5,533,080 | A | * | 7/1996 | Pelc ............................. 378/5 |
| 5,771,269 | A | * | 6/1998 | Chao ............................ 378/5 |
| 5,991,356 | A | | 11/1999 | Horiuchi et al. |
| 6,266,553 | B1 | | 7/2001 | Fluhrer et al. |
| 6,512,807 | B1 | * | 1/2003 | Pohlman et al. ............... 378/4 |
| 6,775,400 | B1 | * | 8/2004 | Zhao et al. .................. 382/131 |
| 2003/0081821 | A1 | * | 5/2003 | Mertelmeier et al. ....... 382/131 |

* cited by examiner

*Primary Examiner*—Jingge Wu
*Assistant Examiner*—Ashutosh Upreti
(74) *Attorney, Agent, or Firm*—Fletcher Yoder

(57) ABSTRACT

A method for volumetric reconstruction of a cyclically moving object using a computed tomography (CT) system includes scanning a cyclically moving object with a CT imaging system including at least one of an area detector and a linear detector to encompass the desired field of view and a rotating gantry to measure projection data during a plurality of cycles of the cyclically moving object. The method also includes dividing a period of the cyclically moving object into a discrete number of phases, identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a three-dimensional image. The method further includes repeating the steps of identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases; and temporally filtering the collection of three-dimensional images on a pixel by pixel basis.

22 Claims, 3 Drawing Sheets

APPARATUS AND METHOD FOR VOLUMETRIC RECONSTRUCTION OF A CYCLICALLY MOVING OBJECT

BACKGROUND OF THE INVENTION

This invention relates generally to computed tomography (CT) imaging and more particularly to volumetric reconstruction of a cyclically moving object using digital area detector technology.

In at least one known computed tomography (CT) imaging system configuration, an x-ray source projects a fan-shaped x-ray beam which is collimated to lie within an X-Y plane of a Cartesian coordinate system which is generally referred to as the "imaging plane". The x-ray beam passes through the object being imaged, such as a patient. The beam, after being attenuated by the object, impinges upon an array of radiation detectors. The array may be a linear detector array where individual detectors are aligned in a row or it may be an area detector where individual detectors form a two-dimensional array. The intensity of the attenuated beam radiation received at the detector array is dependent upon the attenuation of the x-ray beam by the object. Each detector element of the array produces a separate electrical signal that is a measurement of the x-ray intensity incident on the detector element, enabling computation of the beam attenuation at the detector location. The attenuation measurements from all the detectors are acquired separately to produce an attenuation profile.

In known "third generation" CT systems, the orientation of the x-ray source and the detector array are fixed and rotated with a gantry within the imaging plane and around the object to be imaged so that the angle at which the x-ray beam intersects the object changes. From the x-ray attenuation measurements, one computes the integral of the linear attenuation coefficient along a volume connecting the x-ray source with each detector element. This data is known as projection data, and when generated from the detector array at one gantry angular position, is referred to as a "view". A "scan" of the object includes a collection of views made at different angular positions of the gantry relative to the object being scanned, or view angles, during one or more rotations of the x-ray source and detector about the object. In an axial scan, the projection data is processed to construct an image that corresponds to a two-dimensional slice taken through the object. Moreover, if the particular embodiment utilizes a two-dimensional detector, a volumetric reconstruction of the object being scanned may be generated. In this configuration, the scan data acquired from the object is not mathematically complete; however, the images may be useful for imaging evaluations.

One method for reconstructing an image from a set of projection data is referred to in the art as the filtered back-projection technique. In some implementations, this process converts the collection of attenuation measurements from a scan into integers called "CT numbers" or "Hounsfield units", which are used to control the brightness of a corresponding pixel on a cathode ray tube display.

In current, state-of-the-art "third generation" CT systems, gantries have a rotational period of approximately 0.5 seconds. A rotational period of 0.5 seconds is sufficient to arrest or "freeze" most motion within the human body such as minor patient movement during scanning. However, this period is too long to arrest motion in axial images of the heart due to cardiac motion. As a result, novel reconstruction techniques have been developed to improve the temporal resolution in axial reconstructions of the heart, which facilitates a reduction in image artifacts caused by motion of the heart.

One such approach uses projection data acquired over an arc of the complete rotation of the gantry. This approach is called a segment reconstruction strategy and utilizes data acquired at view angles covering an arc length of 180 degrees plus the fan angle of the x-ray beam. For a system with a gantry period of 0.5 seconds, the temporal resolution in reconstructed axial images can be improved to approximately 330 milliseconds. To further improve the temporal resolution in reconstructed images, projection data acquired over multiple rotations of the gantry can be combined. For example, the temporal resolution can be improved to approximately 170 milliseconds if projection data at view angles covering an arc that is half of the arc utilized for the segment reconstruction approach is acquired during one rotation of the gantry, and the remaining projection data is acquired during a subsequent rotation. This approach is called a multi-sector reconstruction algorithm. The multi-sector reconstruction algorithm relies on appropriate selections of gantry speed and helical pitch, which match with the heart rate of the patient being imaged.

The predictability and regularity of the cyclically moving object during the scanning interval inherently limit the temporal resolution achievable with multi-sector reconstruction algorithms. This limitation restricts the ability to diagnose diseases of the coronary vasculature such as the development of atherosclerotic plaque deposits. To further improve the diagnostic potential from reconstructed images, the spatial resolution of existing CT technology can also be increased to facilitate accurate and reliable detection of stenoses in coronary vessels.

BRIEF SUMMARY OF THE INVENTION

In one aspect, a method for volumetric reconstruction of a cyclically moving object using a computed tomography (CT) system is provided. The method includes scanning a cyclically moving object with a CT imaging system including at least one of an area detector and a linear detector to encompass the desired field of view and a rotating gantry to measure projection data during a plurality of cycles of the cyclically moving object. The method also includes dividing a period of the cyclically moving object into a discrete number of phases, identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a three-dimensional image. The method also includes repeating the steps of identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases; and temporally filtering the collection of three-dimensional images on a pixel by pixel basis.

In another aspect, a computed tomography (CT) imaging system for imaging a cyclically moving object is provided. The imaging system is configured to scan a cyclically moving object with a CT imaging system, including at least one of an area detector and a linear detector encompassing the desired field of view and a rotating gantry to generate projection data during a plurality of cycles of the cyclically moving object. Further, the CT system is configured to divide a period of the cyclically moving object into a discrete number of phases, identify an initial set of projection data at a desired phase of a first cycle at a first angle, identify at least one subsequent set of projection data at the same desired phase of a subsequent cycle at an angle that is different from the first angle, and combine the initial set of projection data with each subsequent set of identified projection data and using a reconstruction algorithm to generate a three-dimensional image. The CT imaging system is also configured to repeat the steps of identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases, and temporally filter the collection of three-dimensional images on a pixel by pixel basis.

DETAILED DESCRIPTION OF THE INVENTION

Figure 1:
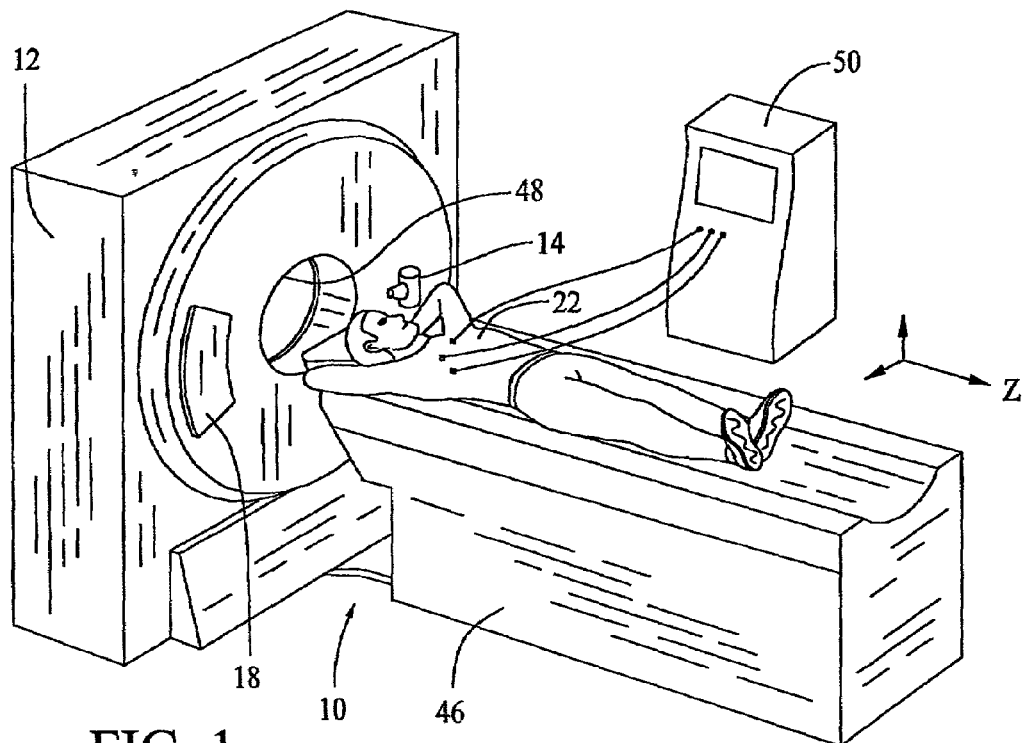
FIG. 1 is a pictorial view of a CT imaging system.
Figure 2:
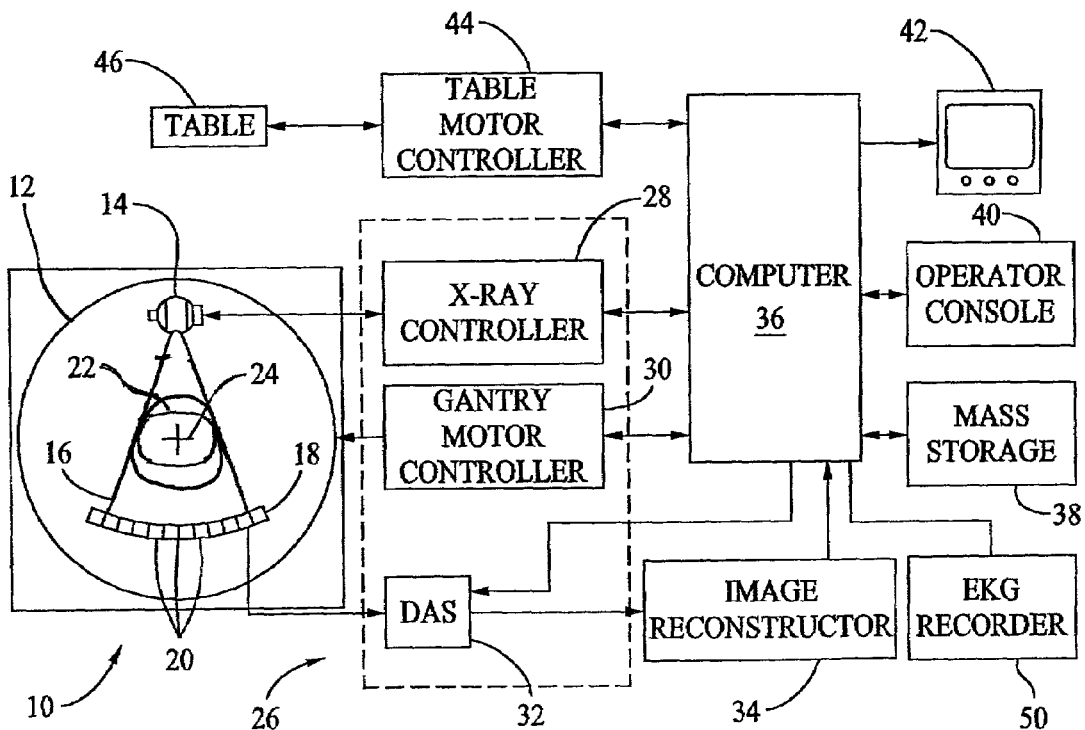
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 (shown in FIG. 2) toward a detector array 18 on the opposite side of gantry 12. Detector array 18 is formed by detector elements 20. Detector elements 20 sense the projected x-rays that pass through an object 22, for example a medical patient. Each detector element 20 produces an electrical signal that represents the intensity of an impinging x-ray beam and can be used to compute the attenuation of the beam as it passes through patient 22. During a scan to acquire x-ray intensity data for generation of projection data, gantry 12 and the components mounted thereon rotate about a center of rotation 24. In one embodiment, detector array 18 is a linear array of detector elements 20. In another embodiment, detector array 18 is a two dimensional array of detector elements 20.

Rotation of gantry 12 and the operation of x-ray source 14 are governed by a control mechanism 26 of CT system 10 in FIG. 2. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. In one embodiment, gantry 12 and control mechanism 26 are unitary. In an alternative embodiment, control mechanism 26 and/or it components are discrete units located within a reasonable proximity to gantry 12. An image reconstructor 34 receives sampled and digitized x-ray data from DAS 32 and performs high-speed image reconstruction. The reconstructed image is applied as an input to a computer 36, which stores the image in a mass storage device 38. Image reconstructor 34 may also send the measured intensity data to computer 36, which then stores the data on mass storage device 38. In another embodiment, image reconstructor 34 is either hardware or software executed within computer 36.

Computer 36 also receives commands and scanning parameters from an operator via console 40 that has a keyboard. An associated cathode ray tube display 42 allows the operator to observe the reconstructed images and other pertinent data from computer 36. The operator supplied commands and parameters are used by computer 36 to provide control signals and information to DAS 32, x-ray controller 28 and gantry motor controller 30. In addition, computer 36 operates a table motor controller 44, which controls a motorized table 46 (shown in FIG. 1) to position patient 22 in gantry 12. In one embodiment, motor controller 44 (shown in FIG. 2) and control mechanism 26 are unitary. In an alternative embodiment, table motor controller 44 is a discrete unit located within a reasonable proximity to gantry table 46 (shown in FIG. 1). Particularly, table 46 moves portions of patient 22 through gantry opening 48. Generally, a processor in at least one of DAS 32, reconstructor 34, and computer 36 (shown in FIG. 2) is programmed to execute the processed described below. Cardiac imaging is accomplished by retrospectively gating scanned CT projection data using a signal recorded from an ECG machine 50 monitoring the cardiac cycles of patient 22. In one embodiment, the signal is synchronized with the acquired projection data. In another embodiment, a signal representative of the ECG signal is generated from the set of projection data themselves. Of course, the method is not limited to practice in CT system 10 and can be utilized in connection with many other types and variations of imaging systems.

Figure 3:
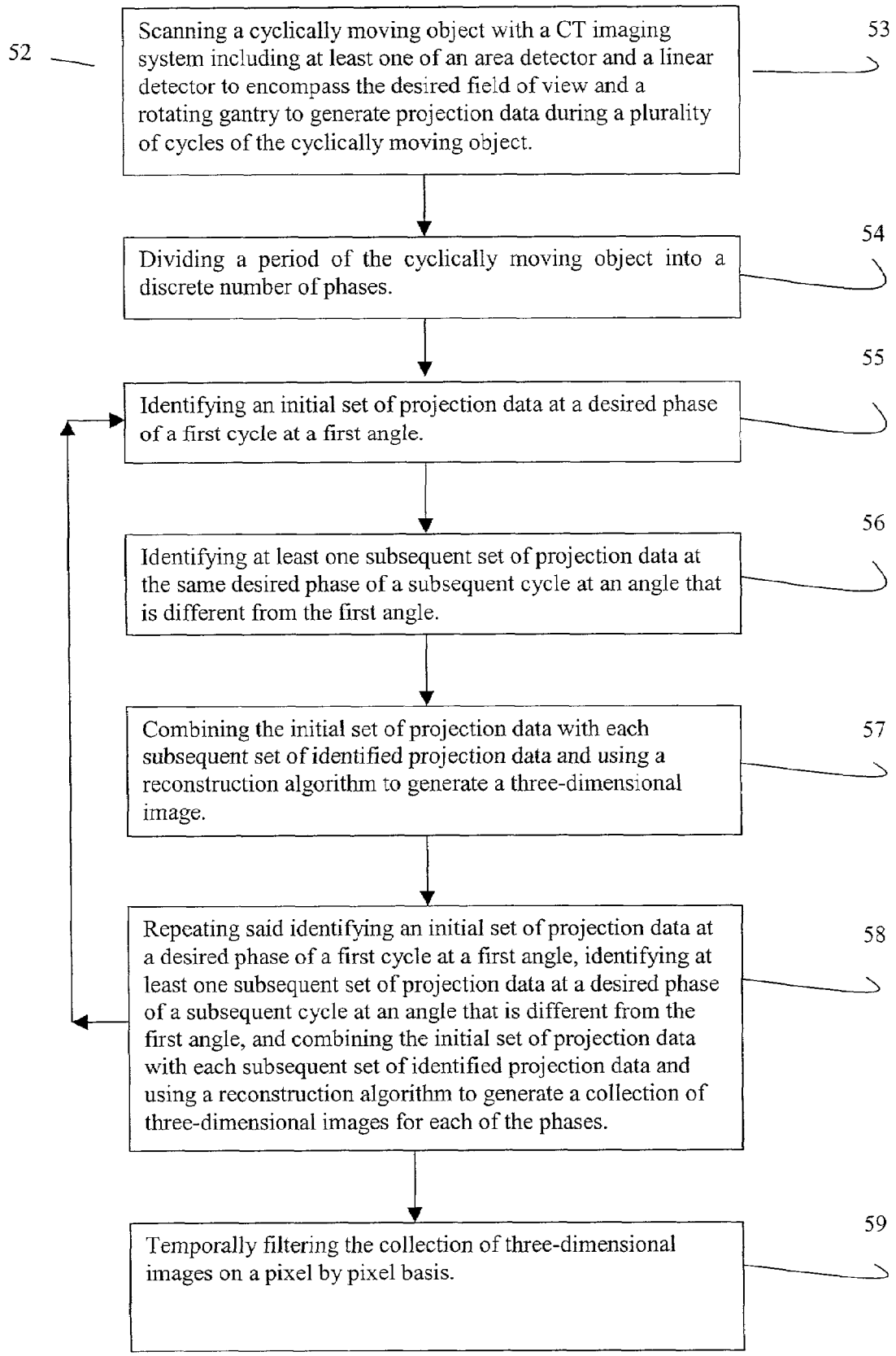
FIG. 3 is a flowchart illustrating a method for volumetric reconstruction of a cyclically moving object using a computed tomography (CT) imaging system.

FIG. 3 is a flow chart illustrating a method 52 for volumetric reconstruction of a cyclically moving object using a computed tomography (CT) imaging system 10 (shown in FIG. 1). Method 52 includes scanning 53 a cyclically moving object with CT imaging system 10 (shown in FIG. 1) including at least one of an area detector 18 (shown in FIG. 1) and a linear detector 18 to encompass the desired field of view and a rotating gantry 12 to generate projection data during a plurality of cycles of the cyclically moving object. Method 52 also includes dividing 54 a period of the cyclically moving object into a discrete number of phases, identifying 55 an initial set of projection data at a desired phase of a first cycle at a first angle, identifying 56 at least one subsequent set of projection data at the same desired phase of a subsequent cycle at an angle that is different from the first angle, combining 57 the initial set of projection data with each subsequent set of identified projection data and using a reconstuction algorithm to generate a three-dimensional image. Method 52 further includes repeating 58 said identifying 55 an initial set of projection data at a desired phase of a first cycle at a first angle, identifying 56 at least one subsequent set of projection data at the same desired phase of a subsequent cycle at an angle that is different from the first angle, and combining 57 the initial set of projection data with each subsequent set of identified projection data and using a reconstruction algorithm to generate a collection of three-dimensional images for the desired phases, and temporally filtering 59 the collection of three-dimensional images on a pixel by pixel basis.

Figure 4:
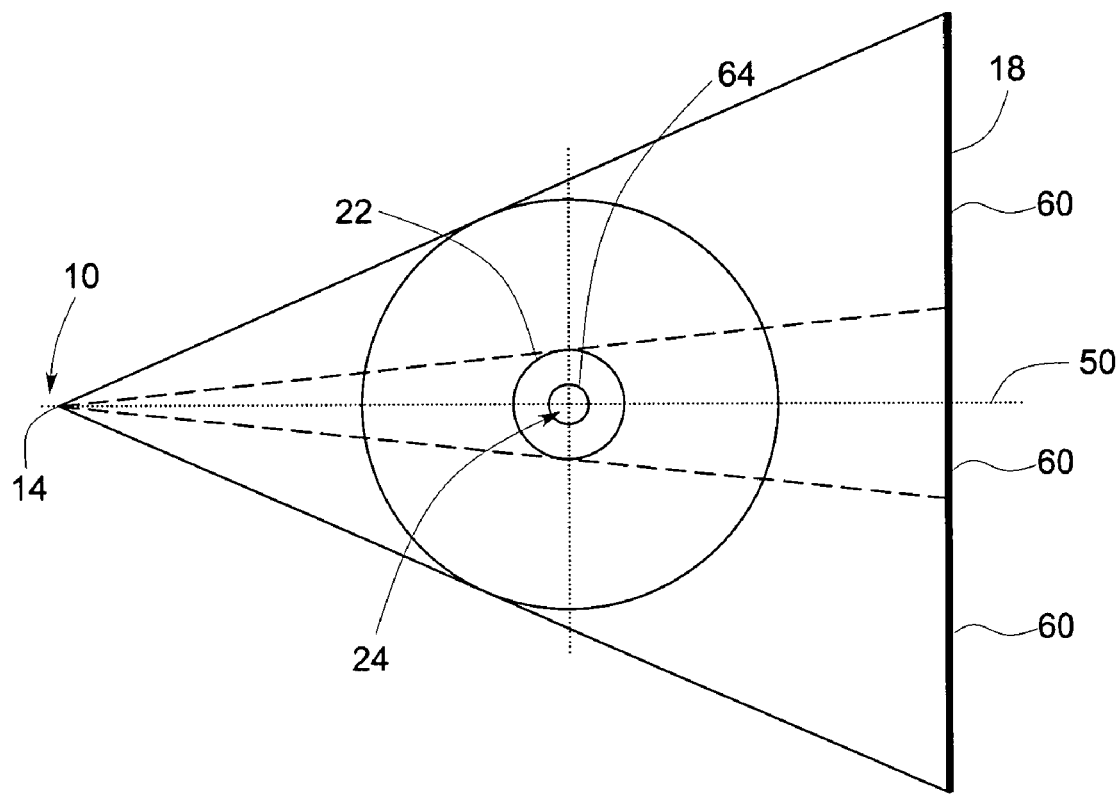
FIG. 4 is another schematic diagram of the CT system illustrated in FIG. 1.
Figure 5:
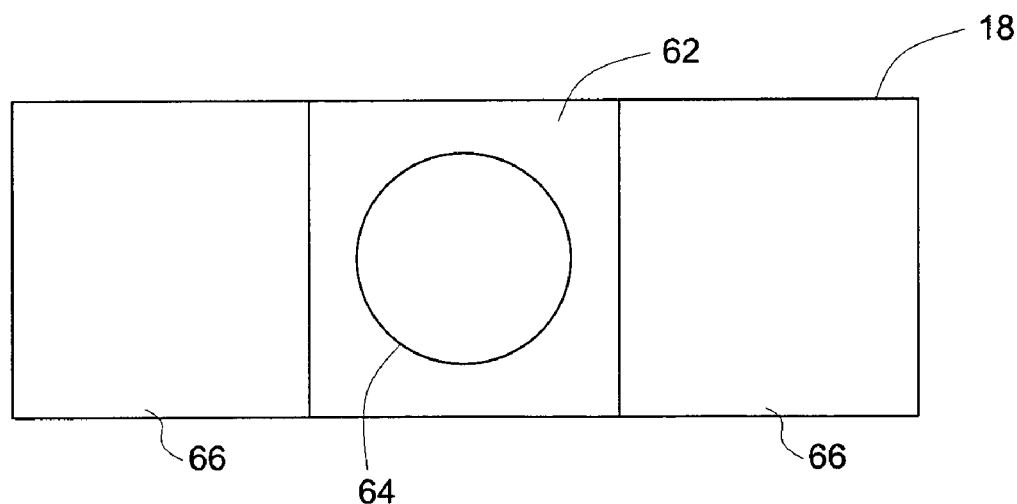
FIG. 5 is a front view of the array panel illustrated in FIG. 1.

Referring to FIGS. 4 and 5, patient 22 is positioned between x-ray source 14 and detector array 18. Center of rotation 24 is about a central axis 50 of x-ray source 14. Detector array 18 may be fabricated as a linear detector 60 or an area detector 60.

FIG. 5 is a front view of detector array 18. In an exemplary embodiment, detector array 18 includes a single high-resolution area detector 62 positioned such that the field of view of area detector 62 encompasses the region shadowed by the cyclically moving object 64, such as a heart, for all view angles. Further, detector array 18 includes a plurality of lower resolution area detectors 66 positioned such that the field of view encompasses the area outside the region shadowed by the heart. Alternatively, any quantity of high-resolution area detectors 62 or lower resolution area detectors 66 may be used to encompass a region of the patient 22 to be scanned by the CT imaging system 10 shown in FIG. 4.

In use, patient 22 (shown in FIG. 1) holds his breath, referred to herein as one hold-breath, defined as approximately 30 seconds or the time an average patient can hold his breath, while a CT imaging scan is performed and the cycles of the cyclically moving object are concurrently recorded on an ECG 50. X-ray intensity data are measured during a plurality of cycles of the cyclically moving object 64 (shown in FIG. 5). Object 64 has motion that is cyclical at a frequency of approximately 60 beats, referred to herein as cycles, per minute. A single cycle is divided into a discrete number of phases. Gantry 12 (shown in FIG. 1) is rotated a single rotation wherein a single rotation of gantry 12 corresponds to 360 degrees of axial rotation. An initial set of projection data of the cyclically moving object 64 (shown in FIG. 5), at a desired phase of a first cycle at a first angle is retrospectively identified using a recorded ECG signal form ECG recorder 50 (shown in FIG. 2) after the complete set of intensity data has been measured during rotation of gantry 12 (shown in FIG. 1). Additionally, a second set, or at least one subsequent set, of projection data at the same desired phase of a subsequent cycle at an angle that is different from the first angle is identified from the recorded ECG signal. The initial set of projection data is combined with the subsequent set of collected data to generate a collection of projection images. The set of projection images are filtered and backprojected, using reconstruction algorithms that are known to those skilled in the art, to reconstruct a three-dimensional image. A subsequent set of projection data at another phase during the cardiac cycle are identified and reconstructed to generate another three-dimensional image. This process continues until all volumetric reconstructions at each of the desired phases of the cyclically moving object have been computed. The collection of three-dimensional images are then temporally filtered on a pixel by pixel basis to minimize artifacts in the individual volumetric reconstructions. The collection of volumetric reconstructions can then be used to generate visualizations of the cyclically moving object characterizing the periodic motion.

In other words, an object is scanned to collect multiple views of the object during multiple periods of its motion. Repeatedly, a subset of the views can be selected to generate a sequence of volumetric images that are very close in time, but have less than excellent image quality. The individual volumetric reconstructions corresponding to particular phases of the cyclic motion can be viewed as stationary scans, i.e., scans of a stationary heart and accordingly the geometry is considered as constant allowing each pixel in the collection of volumetric reconstructions to be temporally filtered on a pixel by pixel basis. This temporal filtering facilitates the improvement in quality of the individual reconstructed volumetric images.

Gantry 12 (shown in FIG. 1) is rotated a single rotation which occurs in approximately 30 seconds or during one hold-breath of patient 22. In one embodiment, using existing area detector technology, approximately 1800 projection views, representing approximately 60 phases of approximately 30 individual cycles, are generated during a single hold-breath, resulting in approximately 30 projection images for each volumetric reconstruction. In an alternative embodiment, the invention is not limited to the quantity of gantry 12 rotations, the duration of the rotation, or the quantity of projection views collected. Also, a plurality of cycles of data are collected and the data is divided into a plurality of phases. At each phase, a three-dimensional reconstruction of the object is computed and then each pixel of the volumetric reconstruction is temporally filtered over the set of volumetric reconstructions on a pixel by pixel basis to reduce artifacts.

In another exemplary embodiment, a plurality of special processing methods are used to reduce streak artifacts from patient 22 due to the view starvation in the filtered back-projection reconstruction process. To minimize these effects, a reconstruction is computed using all 1800 views. The volumetric reconstruction data computed in the area outside the region of the heart is forward-projected to simulate the data acquisition process and to generate a simulated projection data set. The forward-projection process includes simulating an x-ray beam that extends from x-ray source 14 to individual detector elements 20 (shown in FIG. 2). The linear attenuation coefficient in the reconstructed volumetric data set along that path is summed to generate the line integral of the linear attenuation coefficient. This quantity is used to generate the normalized attenuation of x-ray beam 16 along that particular path. This process is repeated for each detector element 20 in the detector array 18 for all projection view angles. Subsequently, the forward-projected data is subtracted from the total projection data generated at each angular position of gantry 12 relative to object 64 (shown in FIG. 5), and the remaining projection data is processed as described above to reduce the reconstruction field of view and minimize streak artifacts. If the artifacts obtained using the filtered backprojection process to reconstruct the volume are still prohibitive, an iterative reconstruction method can be used since the spatial extent of the projection data has been reduced from the boundary of patient 22 (shown in FIG. 1) to a region enclosing only object 64 (shown in FIG. 5). Usually iterative reconstruction methods are computational intensive and therefore prohibitive for these applications. However, the reduction in the reconstructed field of view of the system facilitates the use of these methods.

In another alternative embodiment, images are reconstructed using a segment reconstruction approach from projection data collected during less than a full rotation of the x-ray source and detector around an object. Typically, a segment reconstruction utilizes data obtained from view angles covering an angle of 180° plus the fan angle of x-ray beam 16 (shown in FIG. 2). A "fan angle" refers to an angle of the "fan" of the x-ray beam that can be detected by the detector in the imaging plane. This can be considered to be equal to the angular extent of the detector in the imaging plane, because in at least one known CT imaging system, the x-ray beam emitted by the x-ray source is as wide or wider in angular coverage than is the detector.

The processing methods described herein for "third generation" CT systems, can be also be utilized for "fourth generation" CT systems as well. A "fourth generation" CT scanner incorporates a stationary detector that encircles the entire gantry of the system. The x-ray tube is rotated about the patient, intensity measurements acquired, and projection data are generated at a plurality of angular positions to enable reconstruction of the two-dimensional images or a three-dimensional volume.

While the invention has been described in terms of various specific embodiments, those skilled in the art will recognize that the invention can be practiced with modification within the spirit and scope of the claims.

What is claimed is:

1. A method for volumetric reconstruction of a cyclically moving object in a subject to be imaged using a computed tomography (CT) imaging system, said method comprising:
    scanning a cyclically moving object with a CT imaging system including at least one of an area detector and a linear detector to encompass the desired field of view and a rotating gantry to measure projection data during a plurality of cycles of the cyclically moving object, wherein at least one of the area detector and the linear detector comprises a plurality of low-resolution detectors and a plurality of high-resolution detectors;
    dividing a period of the cyclically moving object into a discrete number of phases;
    identifying an initial set of projection data at a desired phase of a first cycle at a first angle;
    identifying at least one subsequent set of projection data at the same desired phase of a subsequent cycle at an angle that is different from the first angle;
    combining the initial set of projection data with each subsequent set of identified projection data and using a reconstruction algorithm to generate a three-dimensional image;
    repeating said identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases; and
    temporally filtering the collection of three-dimensional images on a pixel by pixel basis.

2. A method in accordance with claim 1 wherein scanning a cyclically moving object with a CT imaging system comprises rotating a gantry such that 360° relative rotational motion of the gantry corresponds to a single rotation of the gantry.

3. A method in accordance with claim 1 wherein the cyclically moving object is a patient's heart, and the cycles of the cyclically moving object represent cardiac cycles, wherein dividing a period of the cyclically moving object into a discrete number of phases comprises recording and analyzing an ECG signal that is representative of the patient's cardiac cycle.

4. A method in accordance with claim 1 wherein scanning a cyclically moving object with a CT imaging system comprises rotating the gantry such that one rotation is completed in one hold-breath of the patient.

5. A method in accordance with claim 1 wherein scanning a cyclically moving object with a CT imaging system comprises:
    providing a single high-resolution detector positioned such that the field of view of the area detector encompasses the region shadowed by the heart for all view angles; and
    providing a plurality of lower resolution detectors positioned such that the field of view of the course area detectors encompasses the area outside the region shadowed by the heart.

6. A method in accordance with claim 1 further comprising:
    forward-projecting data reconstructed from an area outside the region of the cyclically moving object for each view angle position;
    subtracting the forward-projected data from a total projection data computed for each view angle position; and
    reconstructing the residual data to reduce the reconstruction field of view and minimize artifacts.

7. A method in accordance with claim 1 wherein scanning a cyclically moving object with a CT imaging system comprises selecting a gantry rotation speed such that one rotation is completed during the data acquisition window.

8. A method in accordance with claim 1 wherein scanning a cyclically moving object with a CT imaging system comprises selecting a gantry rotation speed such that more than one rotation is completed during a data acquisition window.

9. A method in accordance with claim 1 wherein scanning a cyclically moving object with a CT imaging system comprises rotating the gantry an angular range to utilize a segment reconstruction technique.

10. A method in accordance with claim 6 wherein reconstructing the projection data further comprises reconstructing a collection of volumetric images using iterative methods.

11. A method for volumetric reconstruction of a cyclically moving object in a subject to be imaged using a computed tomography (CT) system, said method comprising:
    scanning a cyclically moving object with a CT imaging system for one revolution of the CT scanner, wherein the CT imaging system includes at least one detector array and a rotating gantry configured to generate projection data during a plurality of cycles of the cyclicallymoving object, wherein the cyclically moving object is a patient's heart, and wherein the detector array comprises a plurality of lower resolution detector elements and a single high-resolution area detector positioned such that the high resolution area detector encompasses the region shadowed by the heart for all view angles and the lower resolution area detectors encompass the area outside the region shadowed by the heart;
    dividing a period of the cyclically moving object into a discrete number of phases;
    identifying an initial set of projection data at a desired phase of a first cycle at a first angle;
    identifying at least one subsequent set of projection data at the same desired phase of a subsequent cycle at an angle that is different from the first angle; and
    combining the initial set of projection data with each subsequent set of identified projection data and using a reconstruction algorithm to generate a three-dimensional image, wherein combining the projection data comprises forward projecting reconstructed data from an area outside the reconstructed region of the heart, subtracting the forward projection data from the total projection data generated, reconstructing the residual data to reduce the reconstruction field of view and minimize artifacts;

repeating said identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases; and temporally filtering the collection of three-dimensional images on a pixel by pixel basis.

12. A computed tomographic (CT) imaging system for imaging a cyclically moving object in a subject to be imaged, said imaging system configured to:

scan a cyclically moving object with a CT imaging system including an at least one of an area detector and a linear detector encompassing the desired field of view and a rotating gantry to generate projection data during a plurality of cycles of the cyclically moving object, wherein at least one of the area detector and the linear detector comprises a plurality of low-resolution detectors and a plurality of high-resolution detectors;

divide a period of the cyclically moving object into a discrete number of phases;

identify an initial set of projection data at a desired phase of a first cycle at a first angle;

identify at least one subsequent set of projection data at the same desired phase of a subsequent cycle at an angle that is different from the first angle; and combine the initial set of projection data with each subsequent set of identified projection data and using a reconstruction algorithm to generate a three-dimensional image; and repeat said identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases; and temporally filter the collection of three-dimensional images on a pixel by pixel basis.

13. A CT imaging system in accordance with claim 12 wherein to scan a cyclically moving object, said CT imaging system configured to rotate a gantry such that 360° relative rotational motion of the gantry corresponds to a single rotation of the gantry.

14. A CT imaging system in accordance with claim 12 wherein to scan a cyclically moving object, said CT imaging system configured to select a gantry rotation speed such that more than one rotation is completed during a data acquisition window.

15. A CT imaging system in accordance with claim 12 wherein the cyclically moving object is a patient's heart, and the cycles of the cyclically moving object represent cardiac cycles, wherein to dividing a period of the cyclically moving object into a discrete number of phases, said system configured to record and analyze an ECG signal that is representative of the patient's cardiac cycle.

16. A CT imaging system in accordance with claim 12 wherein to scan a cyclically moving object, said CT imaging system configured to rotate the gantry such that one rotation is completed in one hold-breath of the patient.

17. A CT imaging system in accordance with claim 12 wherein to scan a cyclically moving object, said CT imaging system configured to:

position a single high-resolution detector such that the field of view of the area detector encompasses the region shadowed by the heart for all view angles; and position a plurality of lower resolution detectors such that the field of view of the course area detectors encompasses the area outside the region shadowed by the heart.

18. A CT imaging system in accordance with claim 12 wherein said CT imaging system further configured to:

forward-project data reconstructed in a region outside the region enclosing the heart for each projection view angle;

subtract the forward-projected data from a total projection data computed for each view angle; and reconstruct the residual data to reduce the reconstruction field of view and minimize artifacts.

19. A CT imaging system in accordance with claim 12 wherein scanning a cyclically moving object with a CT imaging system comprises selecting a gantry rotation speed such that one rotation is completed during the data acquisition window.

20. A CT imaging system in accordance with claim 16 wherein to scan a cyclically moving object, said CT imaging system configured to rotate the gantry an angular range to utilize a segment reconstruction technique.

21. A CT imaging system in accordance with claim 12 wherein to reconstruct the projection data, said CT imaging system further configured to reconstruct a collection of volumetric images using iterative methods.

22. A computed tomographic (CT) imaging system for imaging a cyclically moving object in a subject to be imaged, said imaging system including at least one detector array and a rotating gantry, and said imaging system configured to:

scan a cyclically moving object with a CT imaging system for one revolution of the CT scanner, wherein the CT imaging system includes at least one detector array and a rotating gantry configured to generate projection data during a plurality of cycles of the cyclically moving object, wherein the cyclically moving object is a patient's heart, and wherein the detector array comprises a plurality of lower resolution detectors and a single high-resolution area detector positioned such that the high resolution area detector encompasses the region shadowed by the heart for all view angles and the lower resolution area detectors encompass the area outside the region shadowed by the heart;

divide a period of the cyclically moving object into a discrete number of phases;

identify an initial set of projection data at a desired phase of a first cycle at a first angle;

identify at least one subsequent set of projection data at the same desired phase of a subsequent cycle at an angle that is different from the first angle; and combine the initial set of projection data with each subsequent set of identified projection data and use a reconstruction algorithm to generate a three-dimensional image, wherein combining the projection data comprises forward-projecting reconstructed data from an area outside the region containing the heart, subtracting the forward-projection data from the total projection data, and reconstructing the residual data to reduce the reconstruction field of view and minimize artifacts;

repeat said identifying an initial set of projection data at a desired phase of a first cycle at a first angle, identifying at least one subsequent set of projection data at the same desired phase of a subsequent cycle at an angle that is different from the first angle, and combining the initial set of projection data with each subsequent set of identified projection data and using a reconstruction algorithm to generate a collection of three-dimensional images for the desired phases; and temporally filter the collection of three-dimensional images on a pixel by pixel basis.

* * * * *